(12) United States Patent
Miyagoshi et al.

(10) Patent No.: US 11,019,333 B2
(45) Date of Patent: May 25, 2021

(54) IMAGE TRANSMISSION APPARATUS, IMAGE TRANSPORT SYSTEM AND CODE AMOUNT CONTROL METHOD

(71) Applicant: PANASONIC CORPORATION, Osaka (JP)

(72) Inventors: Takeshi Miyagoshi, Kanagawa (JP); Masaki Sato, Tokyo (JP); Noriyuki Shimizu, Kanagawa (JP); Hiroaki Asano, Kanagawa (JP); Hideki Shingu, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 44 days.

(21) Appl. No.: 16/480,055

(22) PCT Filed: Feb. 28, 2017

(86) PCT No.: PCT/JP2017/007963
§ 371 (c)(1),
(2) Date: Jul. 23, 2019

(87) PCT Pub. No.: WO2018/138934
PCT Pub. Date: Aug. 2, 2018

(65) Prior Publication Data
US 2019/0394462 A1 Dec. 26, 2019

(30) Foreign Application Priority Data

Jan. 25, 2017 (JP) .................................. 2017-011126

(51) Int. Cl.
*H04N 19/115* (2014.01)
*H04N 19/166* (2014.01)
*H04W 28/18* (2009.01)
*H04W 36/14* (2009.01)

(52) U.S. Cl.
CPC ......... *H04N 19/115* (2014.11); *H04N 19/166* (2014.11); *H04W 28/18* (2013.01); *H04W 36/14* (2013.01)

(58) Field of Classification Search
CPC .............. H04N 19/115; H04N 19/166; H04N 21/2385; H04W 28/18; H04W 36/14
See application file for complete search history.

(56) References Cited

U.S. PATENT DOCUMENTS 8,561,104 B1 * 10/2013 Dow ................ H04N 21/44209
725/34
8,837,578 B2 * 9/2014 Gavade .............. H04N 21/6373
375/240

(Continued)

FOREIGN PATENT DOCUMENTS

| JP | 2009-207084 | 9/2009 |
| JP | 2012-049913 | 3/2012 |
| WO | 2013/057763 | 4/2015 |

OTHER PUBLICATIONS

Ishihara, "Musen LAN-jo no DCCP Stream no Rate Suitei", WLAN-QoS Workshop, Feb. 28, 2012 (Feb. 28, 2012), pp. 14-17.

(Continued)

*Primary Examiner* — Boubacar Abdou Tchoussou
(74) *Attorney, Agent, or Firm* — Greenblum & Bernstein, P.L.C.

(57) ABSTRACT

In order to enable efficient utilization of an available bandwidth by properly estimating the available bandwidth under conditions in which the available bandwidth significantly changes upon occurrence of communication path switching, an available bandwidth estimation is performed by estimating a current available bandwidth based on historical communication state information i.e. information on a past communication state stored in a storage to control a code amount used in encoding an image; upon occurrence of (Continued)

communication path switching (handover), acquiring a temporary available bandwidth value corresponding to a new (post-handover) communication path; generating new communication state information corresponding to a new communication state based on the temporary available bandwidth value; replacing the historical communication state information stored in the storage with the new communication state information; and estimating a new available bandwidth based on the new communication state information stored in the storage.

12 Claims, 10 Drawing Sheets

(56) References Cited

U.S. PATENT DOCUMENTS

| | | | | |
|---|---|---|---|---|
| 9,154,820 | B2* | 10/2015 | Oike | H04N 19/114 |
| 2011/0149087 | A1* | 6/2011 | Jeong | H04N 7/148 |
| | | | | 348/207.1 |
| 2012/0195388 | A1* | 8/2012 | Oike | H04N 21/6379 |
| | | | | 375/259 |
| 2012/0236930 | A1* | 9/2012 | Gavade | H04N 21/44209 |
| | | | | 375/240.02 |
| 2013/0263179 | A1* | 10/2013 | Dow | H04N 21/812 |
| | | | | 725/32 |
| 2014/0219251 | A1 | 8/2014 | Kato | |
| 2014/0293782 | A1* | 10/2014 | Weigand | H04L 43/16 |
| | | | | 370/230 |

OTHER PUBLICATIONS

Ishihara, "Predictive rate control for realtime video streaming with network triggered handover", IEEE Communications Society / WCNC, IEEE, 2005, passage III.

Koyama, "Evaluation of effectiveness of rate control mechanisms for the wireless LAN handover using resource prediction on video streaming", IEICE Technical Report, vol. 104, No. 681, Mar. 2005, passage 3.

* cited by examiner (A)        (B)

IMAGE TRANSMISSION APPARATUS, IMAGE TRANSPORT SYSTEM AND CODE AMOUNT CONTROL METHOD

TECHNICAL FIELD

The present invention relates to an image transmission apparatus for transmitting an image data to an image reception apparatus via a communication path including a wireless section, an image transmission system for transmitting an image data from an image transmission apparatus to an image reception apparatus via a communication path including a wireless section, and a code amount control method for controlling a code amount used in encoding an image to generate an image data and transmitting the image data to an image reception apparatus via a communication path including a wireless section.

BACKGROUND ART

In recent years, various types of wireless communication methods have been widely used, and such types of wireless communication methods include cellular communications such as LTE (Long Term Evolution) and wireless LANs, which allow a user to choose any of such wireless communication methods as appropriate when performing wireless communication.

There are existing techniques for providing proper control of data communication in a heterogeneous network; that is, a communication environment in which different types of wireless communication methods are mixedly used, and examples of such known techniques include a communication method in which, upon receiving a notification of handover completion, a communication system recognizes a new communication path used after the handover, predicts a frequency of occurrence of packet losses in the new communication path, and then starts high speed wireless communication, and in which, when a new communication path has a room of available bandwidth capacity, the communication system is allowed to encode data to be transmitted at a high-quality encoding rate (See Patent Document 1).

PRIOR ART DOCUMENT (S)

Patent Document(s)

Patent Document 1: JP2012-049913A

SUMMARY OF THE INVENTION

Task to be Accomplished by the Invention

Moreover, some studies in the field of mobile communication have been focusing on 5G systems (5th generation mobile communication system), and such 5G systems studies support, in addition to existing wireless communication methods, cellular communication methods utilizing a high SHF (Super High Frequency) band or WiGig (Registered Trademark) communications utilizing millimeter bands, and other different wireless communication methods. User of these technologies would advantageously expand a range of users' choices of usable types of communication paths. However, in this case, there can be massive differences in available bandwidths between different types of communication paths, resulting in a problem that an available bandwidth can significantly change when a switch from a communication path to another (handover) occurs.

However, the above-described existing technologies cannot provide proper control of communication when an available bandwidth substantially changes, resulting in a significant decrease in the accuracy of estimation of available bandwidth to be used. That is, an estimated available bandwidth is greatly different from the actual available bandwidth, which delays final determination of an estimated available bandwidth, thereby inconveniently preventing effective utilization of available bandwidths.

The present invention has been made in view of such problems of the prior art, and a primary object of the present invention is to provide an image transmission apparatus, an image transmission system, and a code amount control method, which enables efficient utilization of an available bandwidth by properly estimating the available bandwidth even when the available bandwidth significantly changes upon occurrence of communication path switching.

Means to Accomplish the Task

An aspect of the present invention provides an image transmission apparatus for transmitting an image data to an image reception apparatus via a communication path including a wireless section, the image transmission apparatus comprising:

a communicator configured to transmit the image data to the image reception apparatus;

a storage configured to store historical communication state information which is information on a past communication state; and a controller configured to estimate a current available bandwidth based on the historical communication state information to control a code amount used in encoding an image, wherein, upon occurrence of communication path switching, the controller acquires a temporary available bandwidth value corresponding to a new communication path, generates new communication state information corresponding to a new communication state based on the temporary available bandwidth value, replaces the historical communication state information stored in the storage with the new communication state information, and estimates a new available bandwidth based on the new communication state information stored in the storage.

Another aspect of the present invention provides an image transmission system for transmitting an image data from an image transmission apparatus to an image reception apparatus via a communication path including a wireless section, wherein the image transmission apparatus comprises:

a communicator configured to transmit the image data to the image reception apparatus;

a storage configured to store historical communication state information which is information on a past communication state; and a controller configured to estimate a current available bandwidth based on the historical communication state information to control a code amount used in encoding an image;

wherein, upon occurrence of communication path switching, the controller acquires a temporary available bandwidth value corresponding to a new communication path, generates new communication state information corresponding to a new communication state based on the temporary available bandwidth value, replaces the historical communication state information stored in the storage with the new communication state information, and estimates a new available bandwidth based on the new communication state information stored in the storage.

Yet another aspect of the present invention provides a code amount control method for controlling a code amount used in encoding an image to generate an image data and transmitting the image data to an image reception apparatus via a communication path including a wireless section, the method comprising:

estimating a current available bandwidth based on historical communication state information which is information on a past communication state stored in a storage and controlling the code amount used in encoding the image; and upon occurrence of communication path switching, acquiring a temporary available bandwidth value corresponding to a new communication path, generating new communication state information corresponding to a new communication state based on the temporary available bandwidth value, replacing the historical communication state information stored in the storage with the new communication state information, and estimating a new available bandwidth based on the new communication state information stored in the storage.

Effect of the Invention

According to the present invention, upon occurrence of communication path switching, new communication state information is generated based on a temporary available bandwidth value corresponding to a new communication path, and an available bandwidth is estimated based on the new communication state information corresponding to a new communication state. This configuration enables efficient utilization of an available bandwidth by properly estimating the available bandwidth even when the available bandwidth significantly changes upon occurrence of communication path switching.

DESCRIPTION OF THE PREFERRED EMBODIMENT(S)

Figure 1:
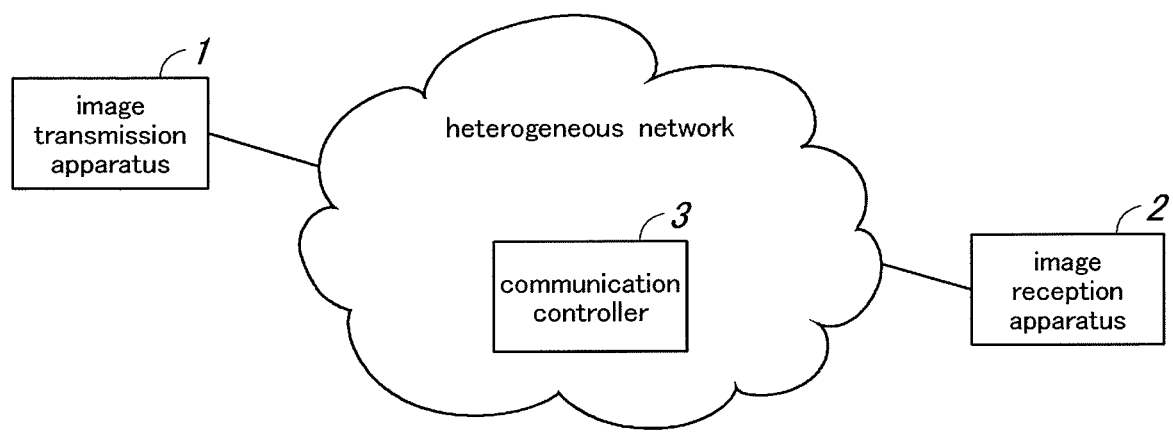
FIG. 1 is a diagram showing a general configuration of an image transmission system according to a first embodiment of the present invention.

A first aspect of the present invention made to achieve the above-described object is an image transmission apparatus for transmitting an image data to an image reception apparatus via a communication path including a wireless section, the image transmission apparatus comprising:

a communicator configured to transmit the image data to the image reception apparatus;

a storage configured to store historical communication state information which is information on a past communication state; and a controller configured to estimate a current available bandwidth based on the historical communication state information to control a code amount used in encoding an image, wherein, upon occurrence of communication path switching, the controller acquires a temporary available bandwidth value corresponding to a new communication path, generates new communication state information corresponding to a new communication state based on the temporary available bandwidth value, replaces the historical communication state information stored in the storage with the new communication state information, and estimates a new available bandwidth based on the new communication state information stored in the storage.

According to the first aspect of the present invention, upon occurrence of communication path switching, new communication state information is generated based on a temporary available bandwidth value corresponding to a new communication path, and an available bandwidth is estimated based on the new communication state information corresponding to a new communication state. This configuration enables efficient utilization of an available bandwidth by properly estimating the available bandwidth even when the available bandwidth significantly changes upon occurrence of communication path switching.

A second aspect of the present invention is the image transmission apparatus of the first aspect, wherein the communicator receives a path switching notification transmitted from a communication control apparatus located on the communication path, and wherein the controller acquires the temporary available bandwidth value corresponding to the available bandwidth from the path switching notification.

According to the second aspect of the present invention, the communicator can acquire a temporary available bandwidth value which is properly determined by the communication controller which grasps a communication state of a new communication path.

A third aspect of the present invention is the image transmission apparatus of the first aspect, wherein the controller uses a predetermined table to generate the new communication state information from the temporary available bandwidth value.

According to the third aspect of the present invention, new communication state information can be generated with reduced processing load.

A fourth aspect of the present invention is the image transmission apparatus of the first aspect, wherein the controller acquires a predetermined number of detection values representing an amount of occurrence of packet losses up to a present time, performs weighted averaging of the predetermined number of detection values by using weighting factors to provide an average number of detection values, and calculates an estimated available bandwidth from the average number of detection values by using a predetermined calculation formula, and immediately after the communication path switching, the controller transits from a normal state to a transient state, in which the weighting factors to be used are changed to weighting factors for the transient state.

According to the fourth aspect of the present invention, final determination of the available bandwidth can be accelerated.

A fifth aspect of the present invention is the image transmission apparatus of the fourth aspect, wherein, when the controller is in the transient state, the controller performs the weighted averaging of the predetermined number of detection values by multiplying each new detection value by a larger weighting factor than a corresponding one used in the normal state, and multiplying each old detection value by a smaller weighting factor than a corresponding one used in the normal state.

According to the fifth aspect of the present invention, final determination of the available bandwidth can be accelerated by using a larger weighting factors for a new detection(s) value so that the new detection value make a more contribution in magnitude to the result of available bandwidth estimation. In some cases, the weighting factors for old detection values may be made zero so that the old detection values are ignored in the available bandwidth estimation.

A sixth aspect of the present invention is the image transmission apparatus of the fourth aspect, wherein the controller returns to the normal state when a predetermined time has elapsed after the transition to the transient state.

According to the sixth aspect of the present invention, the controller can return to the normal state at an appropriate time.

A seventh aspect of the present invention is the image transmission apparatus of the fourth aspect, wherein the controller returns to the normal state when a number of detected packet losses exceeds a predetermined threshold.

According to the seventh aspect of the present invention, the controller can return to the normal state at an appropriate time.

An eighth aspect of the present invention is the image transmission apparatus of the fourth aspect, wherein the controller returns to the normal state when a number of packets successively received after one occurrence of a packet loss exceeds a value assumed from the estimated available bandwidth.

According to the eighth aspect of the present invention, the controller can return to the normal state at an appropriate time.

A ninth aspect of the present invention is the image transmission apparatus of the fourth aspect, wherein the controller returns to the normal state when a number of packets successively received after one occurrence of a packet loss exceeds a value assumed from the estimated available bandwidth.

According to the ninth aspect of the present invention, the controller can return to the normal state at an appropriate time.

A tenth aspect of the present invention is the image transmission apparatus of the first aspect, wherein, when estimating an estimated available bandwidth based on an amount of occurrence of packet losses, the controller determines whether or not each packet loss is a random packet loss caused by external noise in the wireless section, and when the packet loss is determined to be a random packet loss, the controller eliminates the packet loss in estimation of the estimated available bandwidth.

According to the tenth aspect of the present invention, this configuration can prevent the estimated available bandwidth from significantly decreasing due to a random packet loss caused by external noise in the wireless section, thereby leading to inefficient utilization of the available bandwidth.

An eleventh aspect of the present invention is an image transmission apparatus for transmitting an image data to an image reception apparatus via a communication path including a wireless section, the image transmission apparatus comprising:
a communicator configured to transmit the image data to the image reception apparatus;
a storage configured to store a past available bandwidth; and
a controller configured to estimate a current available bandwidth based on the past available bandwidth to control a code amount used in encoding an image,
wherein, upon occurrence of communication path switching, the controller acquires a temporary available bandwidth value corresponding to a new communication path, and estimates a new available bandwidth based on the temporary available bandwidth value.

This configuration enables efficient utilization of an available bandwidth by properly estimating the available bandwidth even when the available bandwidth significantly changes upon occurrence of communication path switching as in the first aspect of the present invention.

A twelfth aspect of the present invention is an image transmission system for transmitting an image data from an image transmission apparatus to an image reception apparatus via a communication path including a wireless section,
wherein the image transmission apparatus comprises:
a communicator configured to transmit the image data to the image reception apparatus;
a storage configured to store historical communication state information which is information on a past communication state; and
a controller configured to estimate a current available bandwidth based on the historical communication state information to control a code amount used in encoding an image;
wherein, upon occurrence of communication path switching, the controller acquires a temporary available bandwidth value corresponding to a new communication path, generates new communication state information corresponding to a new communication state based on the temporary available bandwidth value, replaces the historical communication state information stored in the storage with the new communication state information, and estimates a new available bandwidth based on the new communication state information stored in the storage.

This configuration enables efficient utilization of an available bandwidth by properly estimating the available bandwidth even when the available bandwidth significantly changes upon occurrence of communication path switching as in the first aspect of the present invention.

A thirteenth aspect of the present invention is a code amount control method for controlling a code amount used in encoding an image to generate an image data and transmitting the image data to an image reception apparatus via a communication path including a wireless section, the method comprising:
estimating a current available bandwidth based on historical communication state information which is information on a past communication state stored in a storage and controlling the code amount used in encoding the image; and
upon occurrence of communication path switching, acquiring a temporary available bandwidth value corresponding to a new communication path, generating new communication state information corresponding to a new communication state based on the temporary available bandwidth value, replacing the historical communication state information stored in the storage with the new communication state information, and estimating a new available bandwidth based on the new communication state information stored in the storage.

This configuration enables efficient utilization of an available bandwidth by properly estimating the available bandwidth even when the available bandwidth significantly changes upon occurrence of communication path switching as in the first aspect of the present invention.

Embodiments of the present invention will be described below with reference to the drawings.

First Embodiment

FIG. 1 is a diagram showing a general configuration of an image transmission system according to a first embodiment of the present invention.

The image transmission system includes an image transmission apparatus 1, an image reception apparatus 2, and a communication controller 3. The image transmission apparatus 1 configured to perform image transmission to the image reception apparatus 2 via a heterogeneous network.

The heterogeneous network includes, in addition to one or more base stations utilizing existing wireless communication methods (e.g. access points for cellular communications such as LTE or those for WiFi (Registered Trademark)), one or more access points for cellular communications utilizing a high SHF (Super High Frequency) band proposed in 5G communication technology and/or access points for WiGig (Registered Trademark) communications utilizing millimeter bands. The image transmission apparatus 1 performs image transmission using multiple communication paths via these base stations and/or access points.

The communication controller 3 is configured to control communications which the image transmission apparatus 1 performs using multiple communication paths via these base stations and/or access points in the heterogeneous network, which may serve as, for example, a macro cell base station covering a wide communication area.

Figure 2:
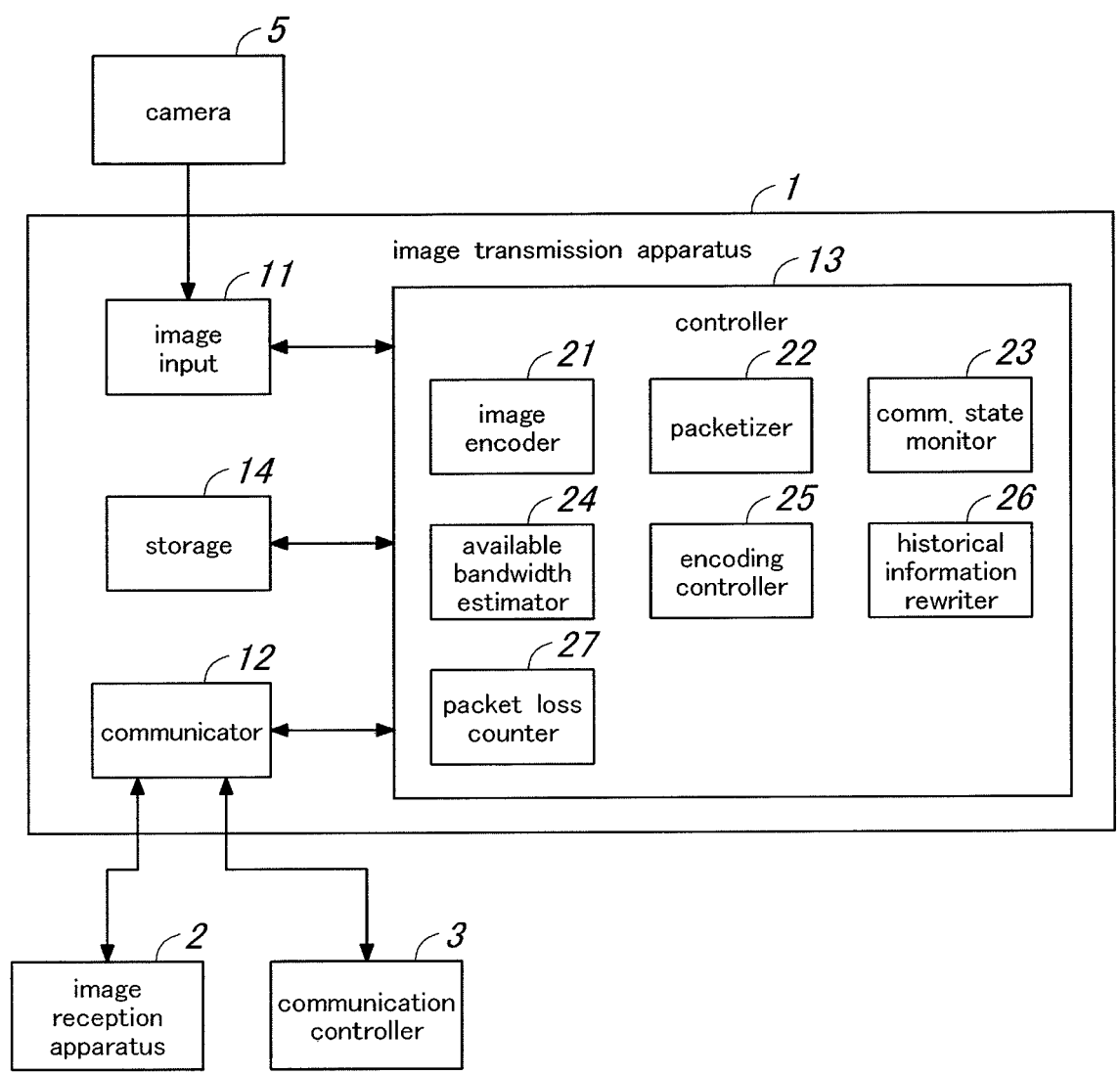
FIG. 2 is a block diagram showing a schematic configuration of an image transmission apparatus 1.

Next, the image transmission apparatus 1 will be described. FIG. 2 is a block diagram showing a schematic configuration of the image transmission apparatus 1.

The image transmission apparatus 1 includes an image input 11, a communicator 12, a controller 13, and a storage 14.

The image input 11 receives image data provided from a camera 5.

The communicator 12 communicates with the image reception apparatus 2 via a communication path. For example, the communicator transmits image packets to the image reception apparatus 2, and receives reception quality information; that is, a communication state monitoring packet (RTCP-RR, including transmission time information) transmitted from the image reception apparatus 2. Furthermore, the communicator 12 communicates with the communication controller 3, and receives, for example, a handover notification transmitted from the communication controller 3.

The storage 14 stores communication state information (packet loss rate, delay time, transmission data amount, and other information), which is historical communication state information i.e. information on a past communication state(s) (during the past several seconds). The communication state information is updated as needed. The storage 14 stores a table used in processing operations such as available bandwidth estimation performed by the controller 13. Moreover, the storage 14 stores programs to be executed by the controller 13.

The controller 13 includes an image encoder 21, a packetizer 22, a communication state monitor 23, an available bandwidth estimator 24, an encoding controller 25, a historical information rewriter 26, and a packet loss counter 27. The controller 13 is implemented by a processor, and each part of the controller 13 is implemented by causing the processor to execute a program stored in the storage 14.

The image encoder 21 encodes the image data received by the image input 11 using a predetermined compression method (for example, H.264 or H.265).

The packetizer 22 divides image codes, which are generated by the image encoder 21, into packets using RTP (Real-time Transport Protocol) or any other suitable method. Moreover, the packetizer 22 notifies the communication state monitor 23 of transmission data amounts.

The communication state monitor 23 works cooperatively and communicates communication state monitoring packets, such as RTCP (RTP Control Protocol) based packets, with the image reception apparatus 2 to acquire communication state information (such as packet loss rate and delay time) included in a received communication state monitoring packet (RTCP-RR), and then notifies the available bandwidth estimator 24 of the acquired communication state information.

The available bandwidth estimator 24 estimates the available bandwidth of a current communication path based on the current communication state information acquired by the communication state monitor 23 and the past communication state information stored in the storage 14 as historical information. In the present embodiment, an available bandwidth is estimated based on communication state information (delay time (RTT) and packet loss rate) according to TFRC (TCP-Friendly Rate Control) specified in RFC 5348/3448.

The encoding controller 25 determines the code amount (compression rate) and resolution used in encoding an image based on the estimated available bandwidth acquired by the available bandwidth estimator 24, and then instructs the image encoder 21 to perform encoding operations aiming for the code amount and resolution.

The historical information rewriter 26 acquires, based on the handover notification received by the communicator 12, a temporary available bandwidth value corresponding to a new communication path. Then, based on the temporary available bandwidth value, the historical information rewriter 26 generates new communication state information appropriate to a new communication state, and then stores the new communication state information in the storage 14. Specifically, the historical information rewriter causes the previous communication state information stored in the storage 14 to be discarded and replaced with the new communication state information.

The packet loss counter 27 counts packet losses that occur within a predetermined time, and notifies the available bandwidth estimator 24 of the count result; that is, the number of detected packet losses. In this particular embodiment, the packet loss counter 27 determines whether or not each packet loss is a random packet loss caused by external noise in the wireless section, and if a packet loss is determined to be a random packet loss, the packet loss counter 27 eliminates the packet loss from the count result.

Figure 3:
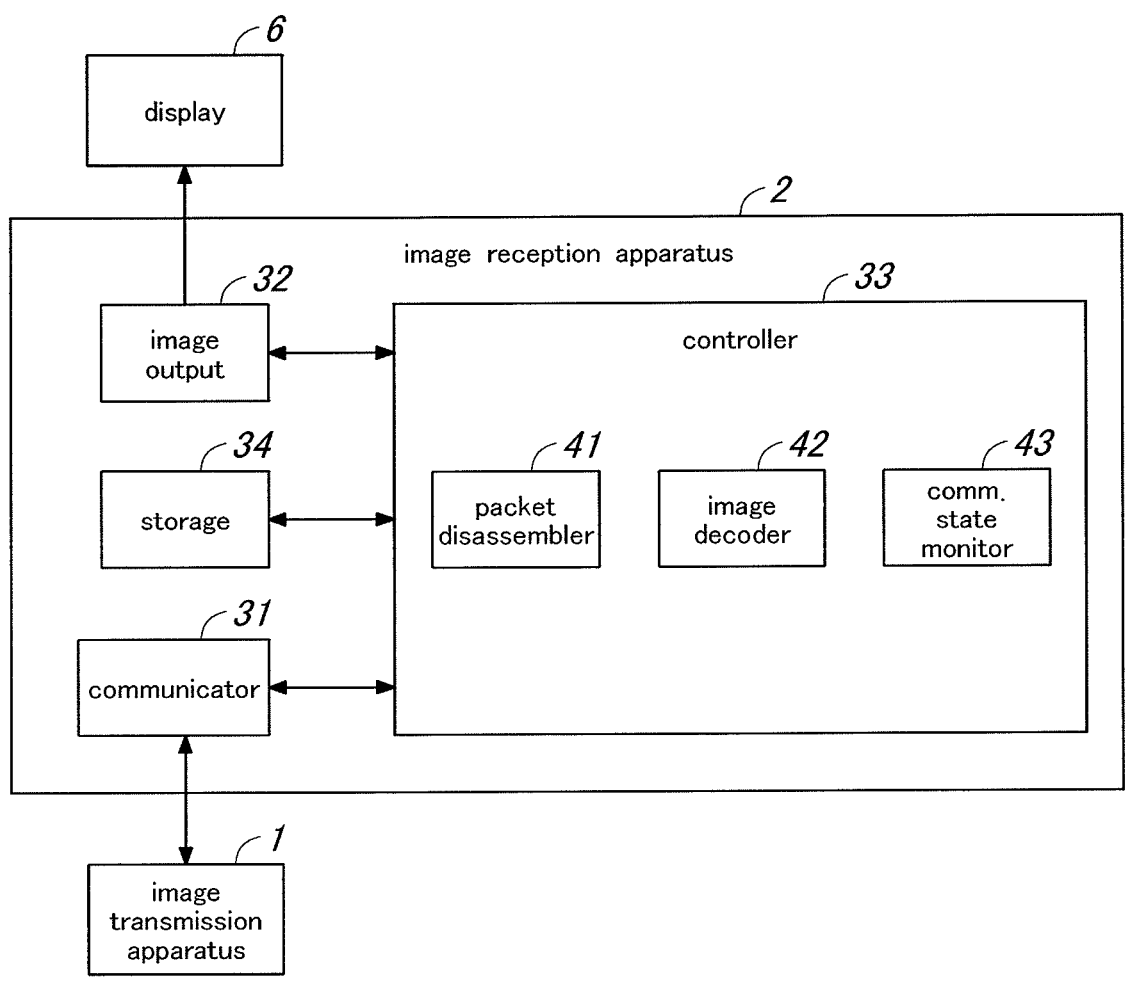
FIG. 3 is a block diagram showing a schematic configuration of an image reception apparatus 2.

Next, the image reception apparatus 2 will be described. FIG. 3 is a block diagram showing a schematic configuration of the image reception apparatus 2.

The image reception apparatus 2 includes a communicator 31, an image output 32, a controller 33, and a storage 34.

The communicator 31 communicates with the image transmission apparatus 1. For example, the communicator 31 receives image packets and a communication state monitoring packet (RTCP-SR, including reception time information) transmitted from the image transmission apparatus 1, and the communicator 31 transmits a communication state monitoring packet (RTCP-RR, including transmission time information) to the image transmission apparatus 1.

The storage 34 stores image packets received by the communicator 31 and/or image data generated by the controller 33. Moreover, the storage 34 stores programs to be executed by the controller 33.

The image output 32 outputs image data generated by the controller 33 to a display 6.

The controller 33 includes a packet disassembler 41, an image decoder 42, and a communication state monitor 43. The controller 33 is implemented by a processor, and each part of the controller 33 is implemented by causing the processor to execute a program stored in the storage 34.

The packet disassembler 41 disassembles image packets received by the communicator 31 to provide image codes. Furthermore, the packet disassembler 41 notifies the communication state monitor 43 of an amount of received data and a number of detected packet losses.

The image decoder 42 decodes the image codes provided from the packet disassembler 41 to output an image data. The image decoder 42 performs this decoding operation based on resolution information included in code data, and thus, when receiving image packets with a resolution different from the size designated by the resolution information, the image decoder 42 changes the resolution of the image by resizing the image to a proper display image size.

The communication state monitor 43 works cooperatively and communicates communication state monitoring packets, which are RTCP (RTP Control Protocol) packets, with the image transmission apparatus 1 to acquire current communication state information (such as packet loss rate and delay time). Then, the communication state monitor 43 measures a delay time of the communication state monitoring packets based on the time stamps thereof, and measures a number of packet losses based on the sequence numbers on the communication state monitoring packets. Then, the communication state monitor 43 transmits a communication state monitoring packet (RTCP-RR) including the acquired communication state information to the image transmission apparatus 1.

Figure 4:
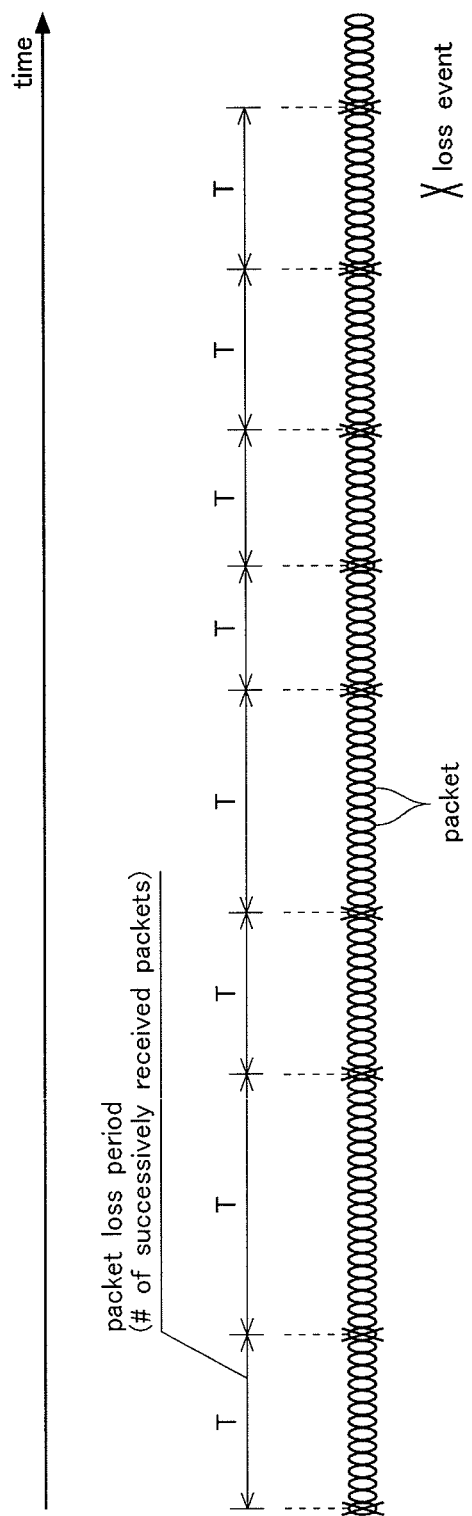
FIG. 4 is an explanatory view showing an averaging operation performed by an available bandwidth estimator 24.

Next, processing operations performed by the available bandwidth estimator 24 of the image transmission apparatus 1 will be described. FIG. 4 is an explanatory view showing an averaging operation performed by the available bandwidth estimator 24.

The available bandwidth estimator 24 estimates an available bandwidth using the following bandwidth calculation formula (Formula 1) defined by TFRC. This bandwidth calculation formula is used to calculate an available bandwidth (average throughput) from a packet loss rate and a round-trip delay time (RTT) that are detected values representing occurrence of packet losses.

$$T = \frac{S}{d\sqrt{\frac{2p}{3}} + 3p(1+32p^2) \cdot R\sqrt{\frac{3p}{8}}} \quad (1)$$

T=average throughput
S=packet size
R=TCP retransmission timeout value (4×RTT)
d=round-trip delay time between transmitter and receiver (RTT)
p=packet loss rate The packet loss rate is given by an inverse of the number of successively received packets (packet loss period), and determined by monitoring packet reception to count the number of successively received packets; that is, the number of successively and normally received packets without any packet loss.

A counter is provided to count normally received packets, and, upon detection of a packet loss, the counter is reset. The available bandwidth estimator 24 repeats the count operation to acquire the number of successively received packets (packet loss period) for each operation. When packet losses occur several times successively, such successive packet losses are counted as one packet loss event.

In order to avoid a significant change in the estimated available bandwidth in response to an occurrence of a packet loss, the available bandwidth estimator 24 performs weighted averaging of packet loss periods (the number of successively received packets) for a predetermined number of times (for example, eight times).

Specifically, first, the available bandwidth estimator 24 performs weighted averaging of the current packet loss period (the number of successively received packets) and the packet loss periods of the precedent seven times to provide an average value of the packet loss periods. The available bandwidth estimator 24 also performs weighted averaging of the past eight packet loss periods to provide an average value of the packet loss periods of the past eight times. Then, the available bandwidth estimator 24 chooses the larger one (not smaller one) of the two average values as an average packet loss period, and determines the packet loss rate, which is an inverse of the average packet loss period.

In this example, the weighting factors are as follows:
{1.0, 1.0, 1.0, 1.0, 0.8, 0.6, 0.4, 0.2}.
These weighting factors are arranged in order from newest to oldest.

Figure 5:
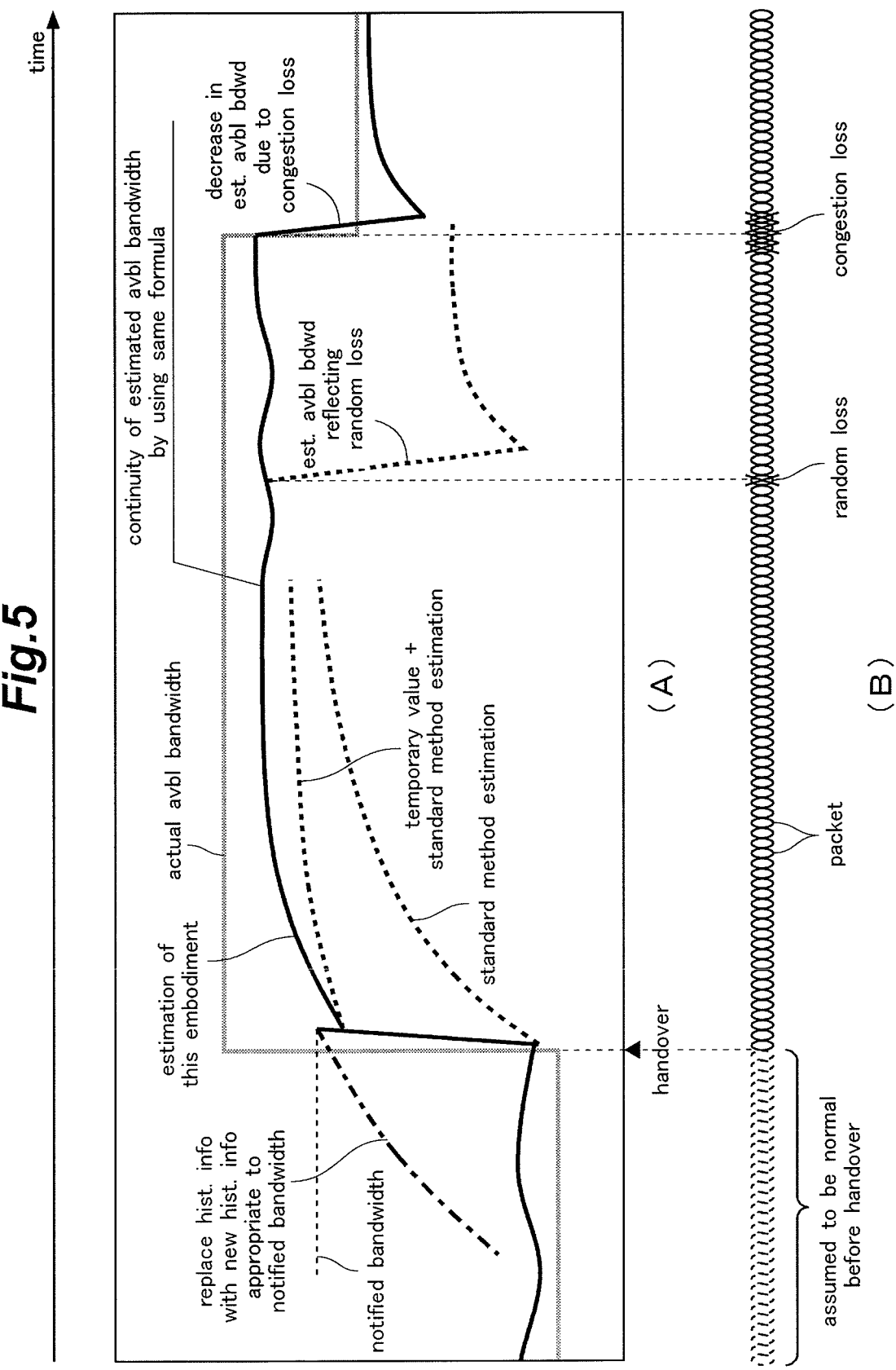
FIG. 5 is an explanatory view showing an example of how an available bandwidth changes and how packet losses occur.

Next, processing operations performed by the historical information rewriter 26 of the image transmission apparatus 1 will be described. FIG. 5A is an explanatory view showing an example of how the available bandwidth changes and FIG. 5B is an explanatory view showing an example of occurrences of packet losses (random loss and congestion losses).

In a heterogeneous network, narrow bandwidth/broad area communication paths and large bandwidth/small area communication paths are mixedly provided, and an available bandwidth can greatly change when a handover (communication path switching) occurs. For example, since LTE systems can provide an available bandwidth of 5 Mbps (and a total capacity of 100 Mbps) while WiGig (Registered Trademark) can provide an available bandwidth of 1 Gbps (and a total capacity of 20 Gbps), when a handover occurs between these two types of communication paths, an available bandwidth can change by two orders of magnitude.

According to a TFRC standard method, since, in order to estimate an available bandwidth based on communication state information (packet loss rate and delay time), historical communication state information i.e. information on a past communication state(s) is used as a basis of the estimation, upon occurrence of communication path switching, an available bandwidth gradually increases in response to a change in the communication state information. Thus, it takes a long time to achieve efficient utilization of the actual available bandwidth.

Therefore, in the present embodiment, when a handover occurs, the communication controller 3 notifies the image transmission apparatus 1 of the available bandwidth corresponding to a new communication path. In response, the image transmission apparatus 1 generates new communication state information appropriate to the available bandwidth notified from the communication controller 3, and causes the previous communication state information stored in the storage 14 to be discarded and replaced with the new communication state information. Then, the available bandwidth estimator 24 estimates a new available bandwidth based on the new communication state information (packet loss rate and delay time).

In this case, it is possible to obtain a packet loss rate (packet loss period) as part of the new communication state information by back calculating a packet loss rate from the bandwidth calculation formula (Formula 1). However, this back calculating method uses a complicated calculation formula, resulting in high processing load. Thus, in the present embodiment, a table representing a relationship between an available bandwidth, a packet loss rate, and a delay time is created in advance based on the bandwidth calculation formula, and the packet loss rate is determined from the temporary available bandwidth value by using this table.

The delay time (RTT) as part of the new communication state information may be the current delay time. In this way, the available bandwidth notified by the communication controller 3, a current delay time, and a packet loss rate (packet loss period) are obtained.

It should be noted that, in the present embodiment, since averaging of the packet loss rates (packet loss periods) is performed, the same values are set as the communication state information stored in the storage 14 a predetermined number of times (for example, eight times) in the past.

In the present embodiment, the communication controller 3 adds information concerning a temporary available bandwidth value corresponding to a new (post-handover) communication path to a handover notification, and then the communication controller 3 transmits the handover notification to the image transmission apparatus 1. The communication controller 3 may be configured to set a temporary available bandwidth value (e.g., 5 Mbps in LTE) according to the type of communication path (such as LET) of the new communication path. The current available bandwidth may be estimated based on a congestion degree and/or the historical communication state information (delay time and packet loss rate). Moreover, the available bandwidth may be measured during a negotiation immediately after handover. In this case, since user data cannot be transmitted during handover, data used for measurement (probe) may be transmitted so that the communication state can be measured.

In this way, in the present embodiment, since the available band estimation is started in consideration of new communication state information appropriate to an available bandwidth corresponding to a new (post-handover) communication path, the estimated available bandwidth can be made closer to the actual value of available bandwidth, and efficient utilization of the available bandwidth can be achieved.

At system startup, it is possible to use an initial available bandwidth value stored in advance as initial setting information in the storage 14, and the subsequent operations can be performed in the same manner as in the case of handover.

Next, processing operations performed by the available bandwidth estimator 24 of the image transmission apparatus 1 will be described.

In the present embodiment, upon occurrence of handover, past communication state information i.e. historical communication state information is discarded and replaced with new communication state information appropriate to an available bandwidth of a new (post-handover) communication path, and the new communication state information is used as a basis of estimation of an available bandwidth, thereby allowing the estimated available bandwidth to be made closer to the actual value of available bandwidth. However, if the subsequent operations for available band estimation are performed according to the TFRC standard method, it takes a long time to finally determine the estimated value of available bandwidth (See FIG. 5).

Therefore, in the present embodiment, the controller 13 is configured to, immediately after handover, transit to a transient state in which estimation operations are modified to accelerate the final determination of available bandwidth. In the transient state, the parameters used for available bandwidth estimation are changed from those for a normal state according to the TFRC standard method. Specifically, the weighting factors used in the weighted averaging of packet loss periods (packet loss rates) are changed.

The weighting factors are preset and contained in factor tables stored in the storage 14. The storage 14 stores factor tables for the normal state and the transient state, respectively, and immediately after handover, the factor table to be used is switched from one for the normal state to one for the transient state.

The weighting factor for the normal state and the weighting factor for the transient state may be set, for example, as follows.

Normal state: {1.0, 1.0, 1.0, 1.0, 0.8, 0.6, 0.4, 0.2}
Transient state: {4.0, 1.0, 1.0, 0.0, 0.0, 0.0, 0.0, 0.0}

In the transient state, factors for new values are set higher values while those for old values are set to 0. In other words, weights are given to the new values and the old values are ignored in the calculation.

In this way, in the present embodiment, immediately after handover, control is performed so as to temporarily change the parameters used for available bandwidth estimation. Thus, immediately after the handover, when the actual value of the available bandwidth is smaller than that notified from the communication controller 3, the estimated value of the available bandwidth is promptly increased, thereby enabling efficient utilization of available bandwidths.

Furthermore, in the present embodiment, when, after the controller 13 transits to the transient state, any of predetermined return conditions is met, the controller 13 returns to the normal state. The return conditions being met means that the final determination of the estimated available bandwidth has been substantially made such that efficient utilization of available bandwidths is adequately achieved or that congestion is occurring because the estimated value of the available bandwidth is excessively increased. When such a condition is met, the controller 13 promptly returns to the normal condition.

In the present embodiment, as a first return condition, when a predetermined time (for example, 30 seconds) elapses after the transition from the normal state to the transient state, the controller 13 returns to the normal state. As a second return condition, when the number of detected packet losses exceeds a predetermined threshold value (for example, twice), the controller 13 returns to the normal state. As a third return condition, when, after a packet loss occurs once, the number of successively received packets (packet loss period) exceeds a value assumed from the current estimated available bandwidth, the controller 13 returns to the normal state. As a fourth return condition, when a predetermined time (for example, 10 seconds) elapses after a packet loss occurs once, the controller 13 returns to the normal state. When any one of the first to fourth return conditions is met, the controller 13 returns to the normal state.

The number of detected packet losses is the number of occurrences of packet loss events, and multiple successive packet losses are counted as one packet loss. Moreover, if a packet loss event is determined to be a random loss, the controller 13 eliminates the packet loss. Thus, the number of occurrences of the packet loss events is the number of occurrences of congestion losses.

In the present embodiment, when any one of the first to fourth return conditions is met, the controller 13 returns to the normal state. However, one of the first to fourth return conditions or any combination thereof may be used as a return condition.

In this way, when the controller 13 returns to the normal state, the available bandwidth estimator 24 performs available bandwidth estimation according to the TFRC standard method.

In this way, in the present embodiment, since the control quickly returns to one according to the TFRC standard method, consistency and fairness with other users' communications can be secured. Further, since the same bandwidth calculation formula defined by TFRC is used in both of the transient state and the normal state, when the controller 13 returns from the transient state to the normal state, continuity of the estimated available bandwidth value can be maintained.

Figure 6:
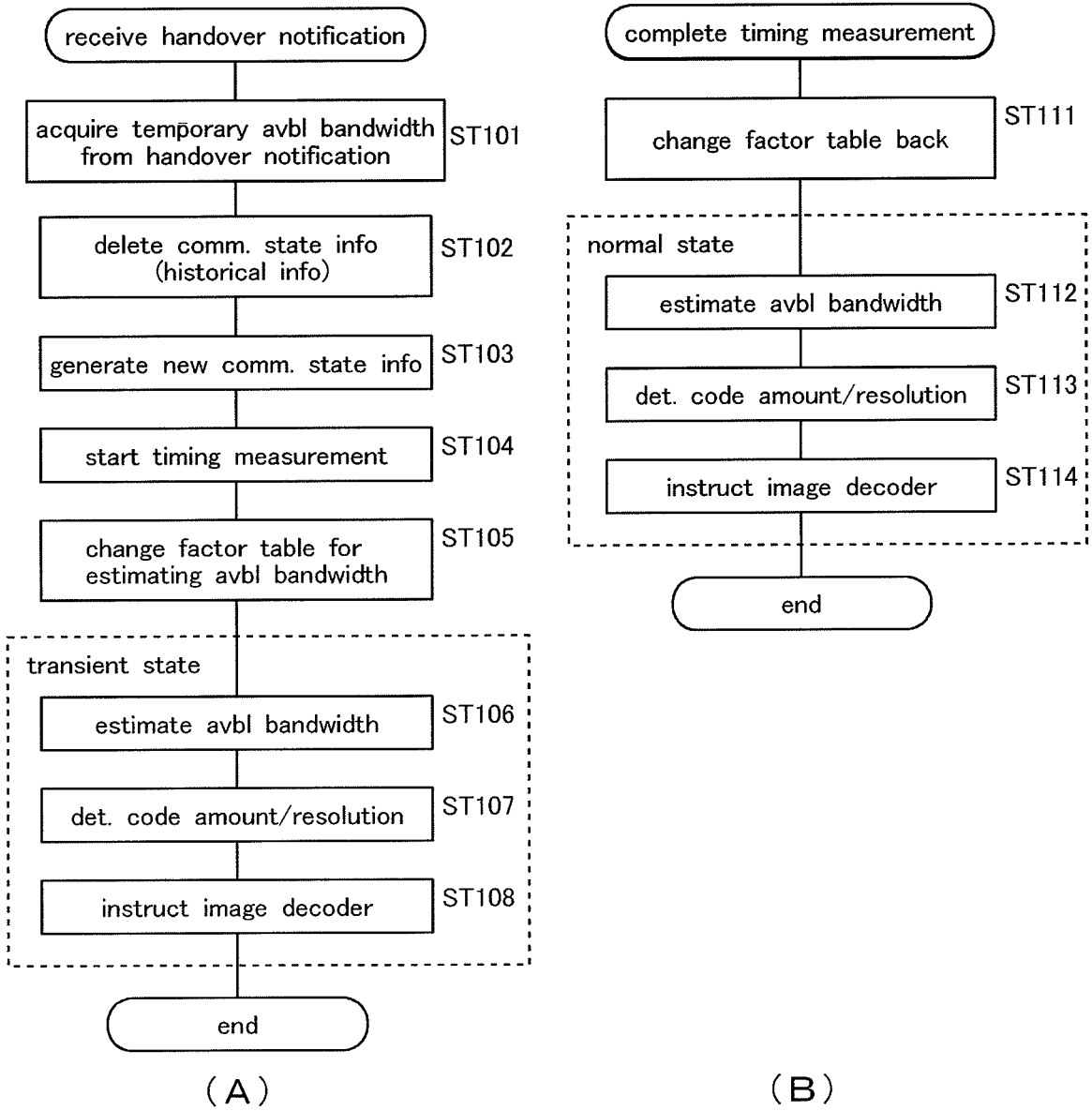
FIG. 6 is a flowchart showing operation procedures of the available bandwidth estimator 24.
Figure 7:
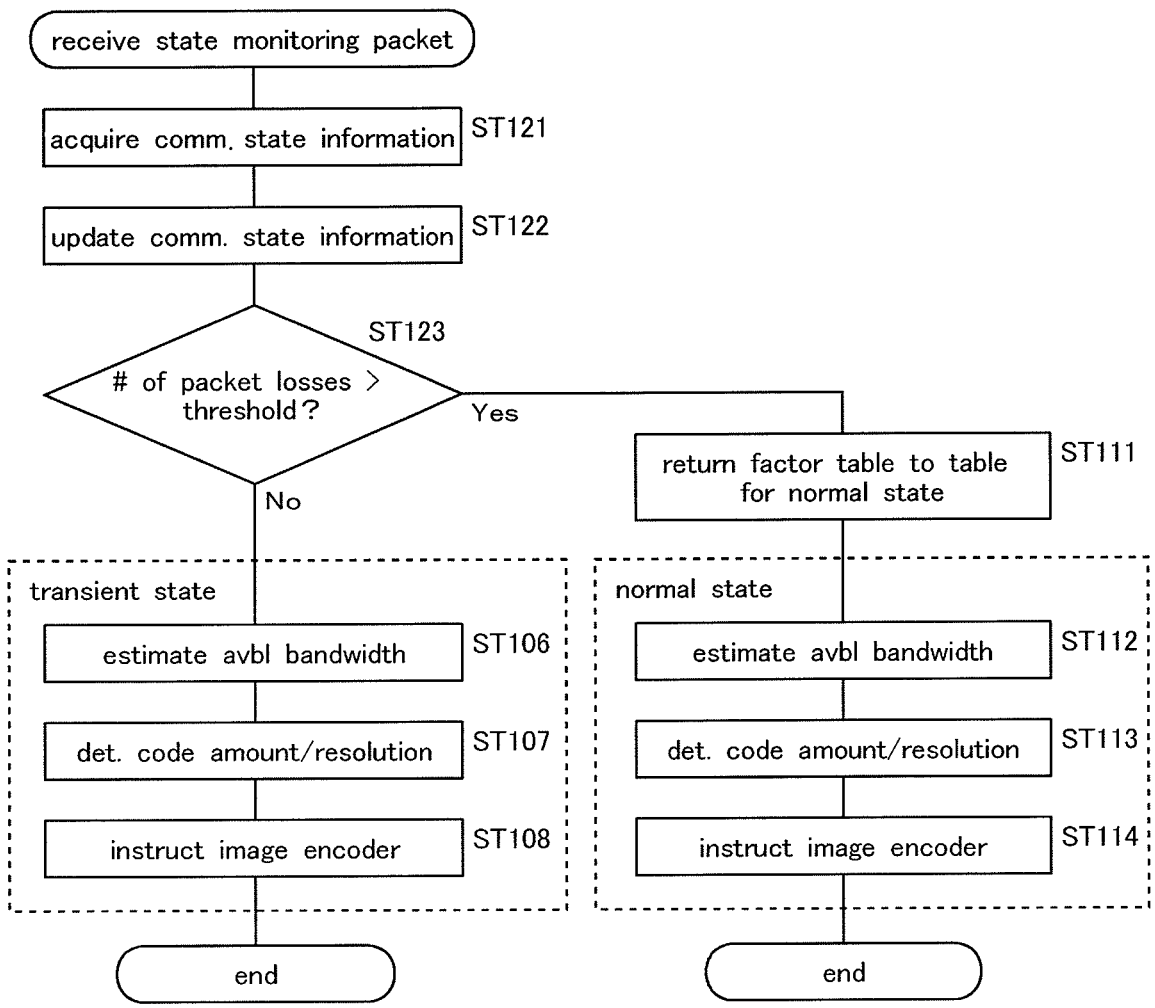
FIG. 7 is a flowchart showing an operation procedure of the available bandwidth estimator 24.

Next, operation procedures of the available bandwidth estimator 24 of the image transmission apparatus 1 will be described. FIGS. 6 and 7 are flowcharts showing operation procedures of the available bandwidth estimator 24.

First, operations performed when a handover occurs and the communicator 12 receives a handover notification will be described. As shown in FIG. 6A, the controller 13 acquires a temporary available bandwidth value of a new (post-handover) communication path included in a handover notification (ST101).

Next, the controller 13 deletes the communication state information (historical information) stored in the storage 14 (ST102). Then, the controller 13 generates new communication state information based on the temporary available bandwidth value notified from the communication controller 3 and stores the new communication state information in the storage 14 as historical information (ST103). In this case, the controller 13 calculates the communication state information by back-calculation from the available bandwidth.

Next, a timer starts timing measurement (ST104).

Next, the controller 13 switches the factor table to be used for available band estimation from the factor table for the normal state to one for the transient state (ST105). In this way, the controller 13 transits to the transient state.

Next, the available bandwidth estimator 24 estimates an available bandwidth based on the communication state information (historical information) (ST106). Then, the encoding controller 25 determines a code amount and a resolution based on the estimated value of the available bandwidth (ST107). Then, the encoding controller 25 instructs the image encoder 21 to perform encoding operations aiming for the determined code amount and resolution (ST108).

Next, an operation procedure performed when the timer expires, that is, when a predetermined time (for example, 30 seconds) elapses after the transition from the normal state to the transient state will be described. First, as shown in FIG. 6B, the controller 13 returns the factor table to be used from the one for the transient date to one for the normal state (ST111). Thus, the controller 13 returns to the normal state, and the available bandwidth estimator 24 estimates an available bandwidth using the table for the normal state (ST112). Then, the encoding controller 25 determines a code amount and a resolution (ST113) and instructs the image encoder 21 to perform encoding operations (ST114).

Next, an operation procedure performed when the communicator 12 receives a communication state monitoring packet transmitted from the image reception apparatus 2 will be described. As shown in FIG. 7, the controller 13 acquires communication state information (delay time, number of detected packet losses and number of received packets) included in a received state monitoring packet (ST121). Then, the controller 13 updates the communication state information (historical information) stored in the storage 14 (ST122).

Next, the controller 13 determines whether or not the number of detected packet losses exceeds a predetermined threshold (for example, twice) (ST123).

If the number of detected packet losses is equal to or less than the threshold (No in ST123), the controller 13 remains in the transient state, and the available bandwidth estimator 24 estimates an available bandwidth using the factor table for the transient state (ST106), and then the controller 13 determines a code amount and a resolution (ST107) and instructs the image encoder 21 to perform encoding operations (ST108).

If the number of detected packet losses exceeds the threshold (Yes in ST123), the controller 13 returns the factor table used for available bandwidth estimation from one for the transient state to one for the normal state (ST111). As a result, the controller 13 returns to the normal state, and the available bandwidth estimator 24 estimates an available bandwidth using the factor table for normal state (ST112), and then the controller 13 determines a code amount and a resolution (ST113) and instructs the image encoder 21 to perform encoding operations (ST114).

In the example shown in FIG. 7, the controller 13 is configured such that, if a predetermined time (for example, 30 seconds) elapses after the transition from the normal state to the transient state, or if the number of detected packet losses exceeds a predetermined threshold value, the controller 13 returns to the normal state. In some cases, the controller 13 may be configured such that, if the number of successively received packets (packet loss period) exceeds a value assumed from the current estimated available bandwidth after a packet loss occurs once, or if a predetermined time (for example, 10 seconds) elapses after a packet loss occurs once, the controller 13 returns to the normal state.

Figure 8:
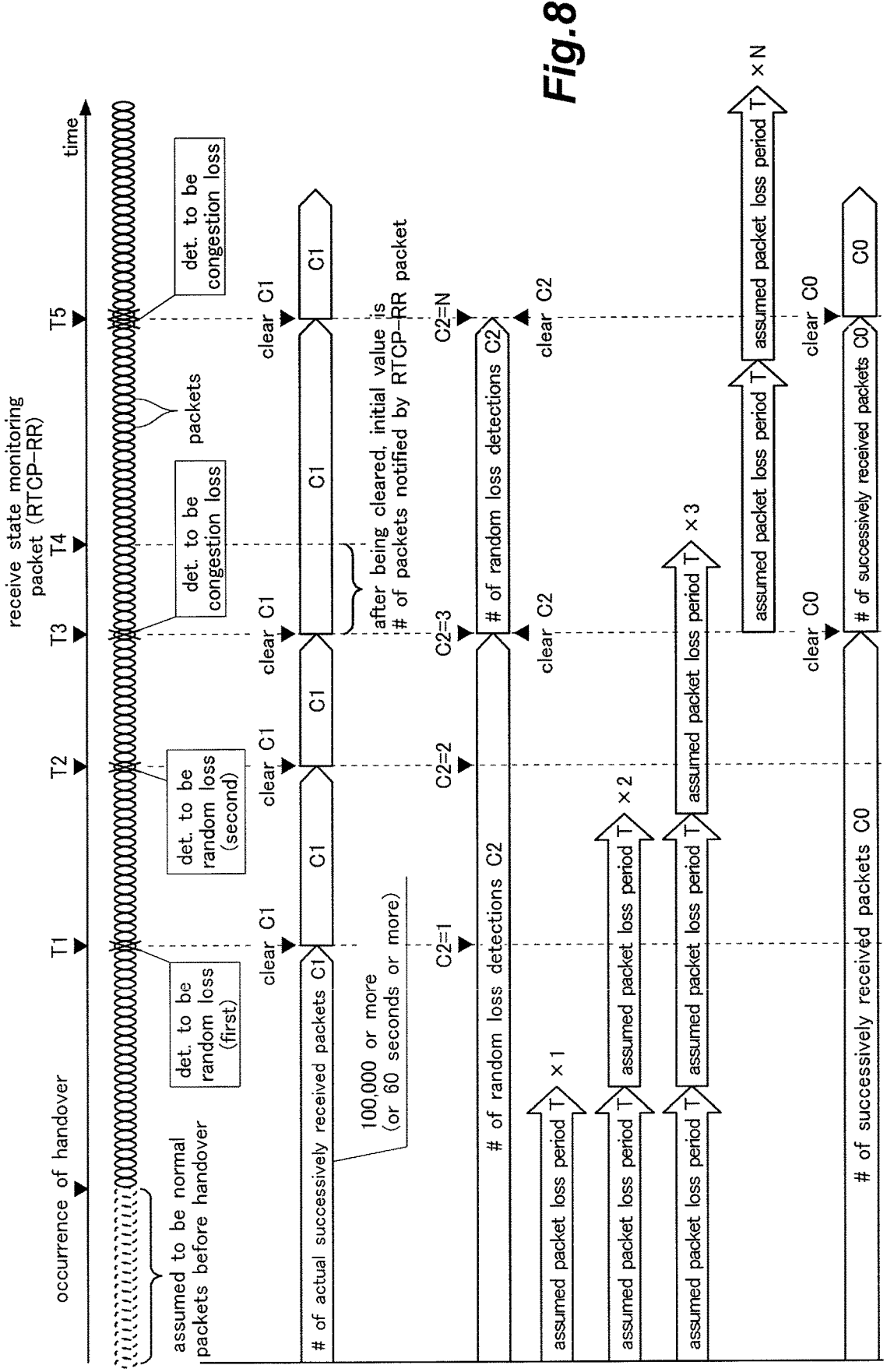
FIG. 8 is an explanatory view showing examples of how counters in a packet loss counter 27 operate.

Next, operations of the packet loss counter 27 of the image transmission apparatus 1 will be described. FIG. 8 is an explanatory view showing examples of how counters in the packet loss counter 27 operate.

In the present embodiment, the available bandwidth estimator 24 estimates an available bandwidth according to how packet losses occur. Specifically, the available bandwidth estimator 24 estimates an available bandwidth based on the packet loss rate. Thus, once a packet loss occurs, the estimated value of the available bandwidth significantly decreases.

Packet losses include a packet loss caused by congestion (congestion loss) and a packet loss caused by external noise (random loss). A congestion loss occurs when an amount of transmission exceeds an available bandwidth capacity, whereas a random loss can occur even when an amount of transmission does not exceed an available bandwidth capacity. Thus, if the controller 13 is configured to, upon occurrence of packet losses, narrow an available bandwidth in the same way regardless of the type of packet loss, the available bandwidth can be narrowed even when a random loss occurs and an amount of transmission does not exceeds an available bandwidth capacity, which leads to inefficient utilization of available bandwidths (See FIG. 5).

In other words, as occurrence of a congestion loss reflects an actual available bandwidth, the controller 13 needs to narrow an available bandwidth in response to occurrence of a congestion loss, and as occurrence of a random loss does not reflect an actual available bandwidth, the controller 13 does not need to narrow an available bandwidth in response to occurrence of a random loss.

Thus, in the present embodiment, in order to avoid the unnecessary reduction of available bandwidth in response to such random losses, the controller 13 determines whether or not a detected packet loss is a random loss, and when the packet loss is determined to be a random loss, the controller 13 controls such that the packet loss detection result does not affect the available bandwidth estimation.

According to the TFRC standard method, when a packet loss occurs, a counter for counting the number of successively and normally received packets (the number of successively received packets) is reset. However, in the present embodiment, if the packet loss is determined to be a random loss, the controller 13 does not reset the counter for counting the number of successively received packets. In this way, this can prevent the packet loss detection result from affecting the available bandwidth estimation.

With regard to the determination of the type of a detected packet loss, a packet loss is determined to be a random loss if it is detected when the frequency of occurrence of packet loss is low, and a packet loss is determined to be a congestion loss if it is detected when the frequency of occurrence of packet loss is high.

Specifically, a detected packet loss is determined to be a random loss if it is detected when the packet loss occurrence interval exceeds a predetermined threshold. In some cases, the threshold is a packet loss rate assumed from the estimated current available bandwidth, and a detected packet loss is determined to be a random loss if the packet loss rate exceeds the threshold. In some cases, the threshold is the number of successively received packets (packet loss period) assumed from the estimated current available bandwidth, and a detected packet loss is determined to be a random loss if it is detected when the number of successively received packets exceeds the threshold.

The threshold value used to determine whether or not a packet loss is a random loss can be obtained from the estimated current available bandwidth by using a predetermined calculation formula.

In the present embodiment, the packet loss counter includes three counters which are configured to count the number of successively received packets, count the actual number of successively received packets, and count the number of random loss detections, respectively.

The counter for counting the number of successively received packets counts the number of successively and normally received packets, and the counter value of this counter i.e. the number of successively received packets (packet loss period) is used for the available bandwidth estimation. The counter for counting the actual number of successively received packets counts the actual number of successively and normally received packets, and is used to determine the type of packet loss. The counter for counting the number of random loss detections counts the number of the random losses after the latest congestion loss occurs.

In the following description, C0 denotes the number of successively received packets, which is a count value of the counter therefor, C1 denotes the actual number of successively received packets, which is a count value of the counter therefor, and C2 denotes the number of random loss detections, which is a count value of the counter therefor.

When a packet loss occurs, the counter for counting the actual number of successively received packets C1 is reset. Then, the controller 13 compares the current number of successively received packets C0 with a reference value (T×C2) obtained by multiplying an assumed packet loss period T by the current number of random loss detections C2, and, if the current number of successively received packets C0 does not exceed the reference value (T×C2), a packet loss is determined to be a congestion loss. The assumed packet loss period T is assumed from the current available bandwidth, and may be calculated from the current available bandwidth using a predetermined table or calculation formula. If it is a congestion loss, the counter for counting C0 (the number of successively received packets) and the counter for counting C2 (the number of random loss detections) are reset.

In the example shown in FIG. 8, packet losses occur at times T1, T2, and T3 after the occurrence of handover. The counter for counting C1 (the actual number of successively received packets) is cleared at these times T1, T2, and T3, respectively. Then, a communication state monitoring packet (RTCP-RR) is received at time T4.

In the present embodiment, random loss determination is performed in response to receiving a communication state monitoring packet (RTCP-RR), and in the example shown in FIG. 8, random loss determination is performed at time T4 when the communication state monitoring packet is received.

In this case, at time T1, the number of successively received packets C0 is the same as the actual number of successively received packets C1 and exceeds the reference value (T×C2 (=1)), and thus, the packet loss is regarded as a random loss, and the number of random loss detection C2 is one. At time T2, the number of successively received packets C0 is the same as the actual number of successively received packets C1, and exceeds the reference value (T×C2 (=2)), and thus, the packet loss is regarded as a random loss, and the number of random loss detection C2 is one. At times T1 and T2, the counter for counting the actual number of successively received packets C1 is cleared and the counter for counting the number of successively received packets C0 is not cleared.

At time T3, the number of successively received packets C0 is the same as the actual number of successively received packets C1 and does not exceed the reference value (T×C2 (=3)), and thus the packet loss is regarded as a congestion loss and the counter for counting the number of random loss detections C2 is cleared. Moreover, the counter for counting the actual number of successively received packets C1 and the counter for counting the number of successively received packets C0 are cleared. After being cleared, the initial value of the counter for counting the actual number of successively received packets C1 is the number of received packets notified by the communication state monitoring packet.

On the assumption on that packets have been normally received before the handover, the actual number of the successively received packets C1 is a sufficiently large value (100,000 or more or 60 seconds or more).

In the example shown in FIG. 8, multiple successive packet losses occur at time T5. At T5, the number of random loss detections C2 is N and the number of successively received packets C0 does not exceed the reference value (T×C2), and thus the packet losses are regarded as congestion losses and the counter for counting the number of random loss detections C2 is cleared. Moreover, the counter for counting the actual number of successively received packets C1 and the counter for counting the number of successively received packets C0 are cleared.

Figure 9:
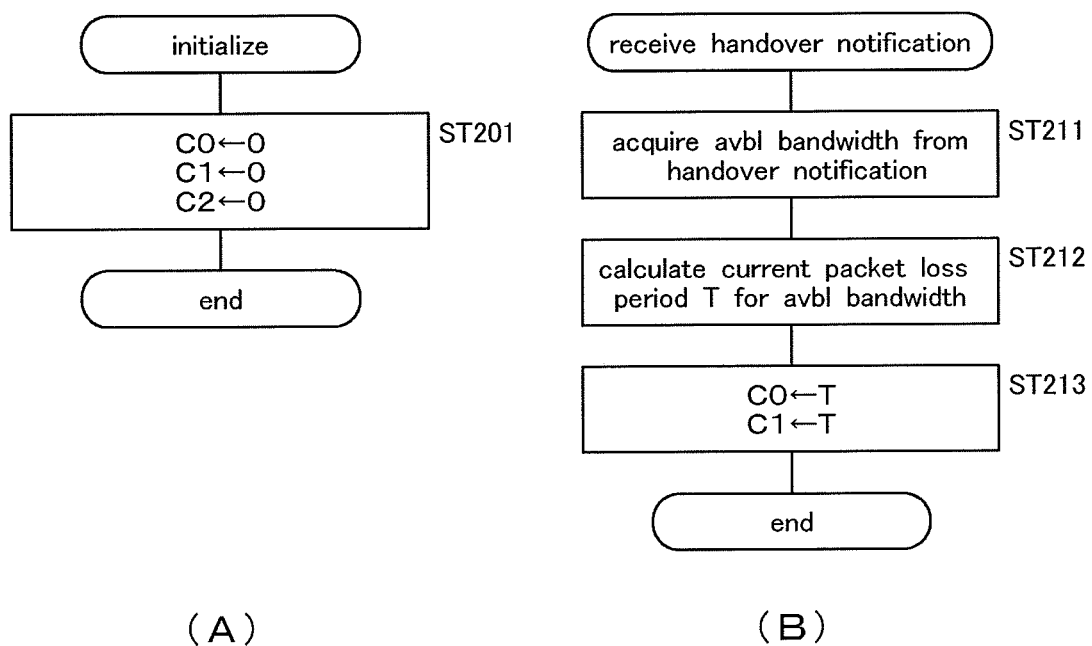
FIG. 9 is a flowchart showing operation procedures of the packet loss counter 27.
Figure 10:
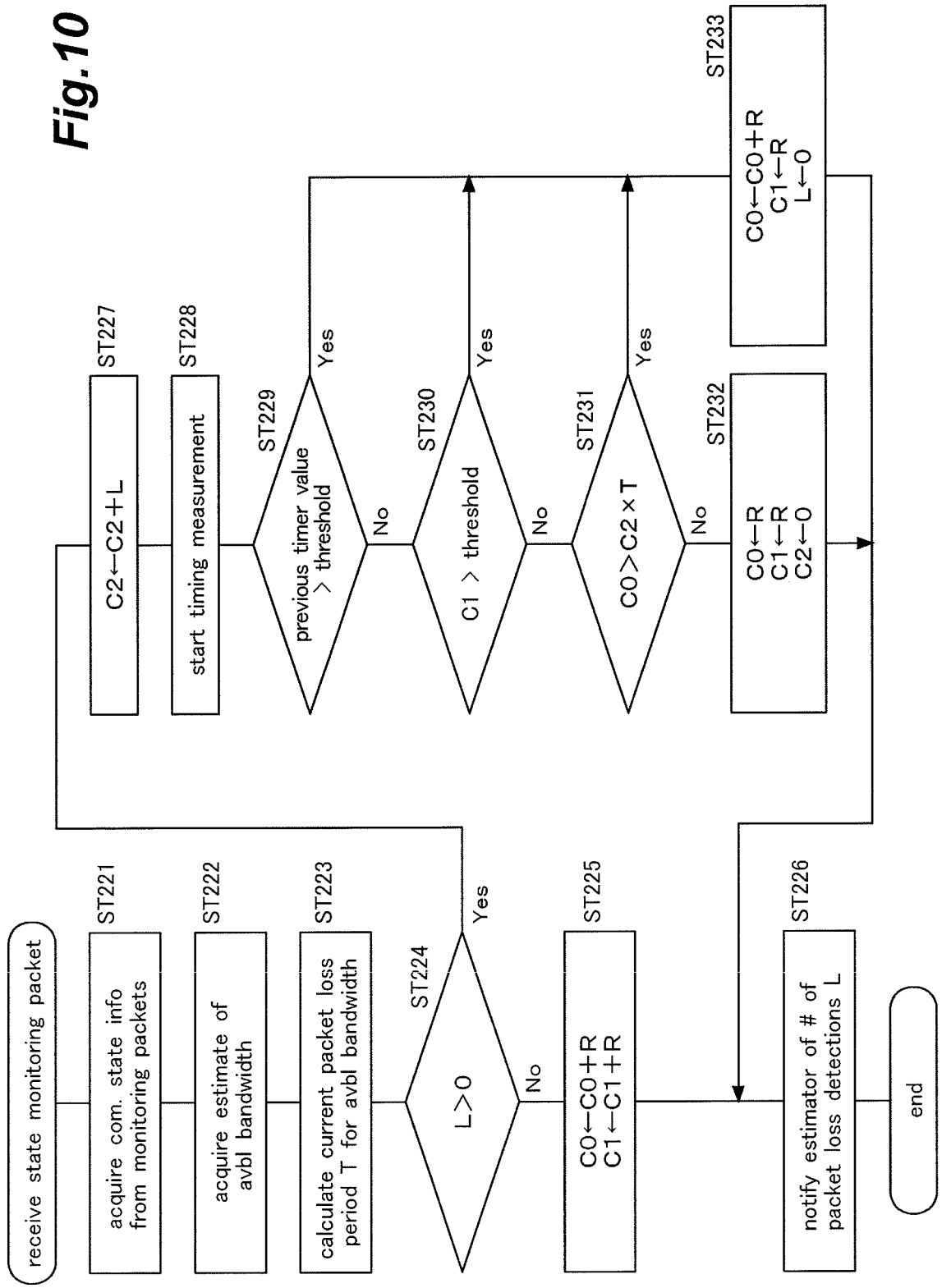
FIG. 10 is a flowchart showing an operation procedure of the packet loss counter 27.

Next, operation procedures of the packet loss counter 27 of the image transmission apparatus 1 will be described. FIGS. 9 and 10 are flowcharts showing operation procedures of the packet loss counter 27.

First, an initialization operation will be described. At this step, the counters are initialized as shown in FIG. 9A. The counter for counting the number of successively received packets C0, the counter for counting the actual number of successively received packets C1, and the counter for counting the number of random loss detections C2 are initialized; that is, the number of successively received packets C0, the actual number of successively received packets C1, and the number of random loss detections C2 are set to 0 (ST201).

Then, an operation procedure performed when a handover occurs and the communicator 12 receives a handover notification will be described. As shown in FIG. 9B, first, the packet loss counter acquires an available bandwidth of a new (post-handover) communication path included in the handover notification (ST211). Next, the packet loss counter 27 acquires a packet loss rate and a packet loss period T assumed from the current available bandwidth (ST212). Then, the counter for counting the number of successively received packets C0 and the counter for counting the actual number of successively received packets C1 are set to the packet loss period T (ST213).

In this way, since the controller 13 is in the transient state immediately after handover, the counters are set to values assumed from the available bandwidth notified from the communication controller 3 regardless of an amount of occurrence of packet losses.

At system startup, the packet loss counter 27 operates in the same manner as when receiving a handover notification shown in FIG. 9B.

Next, operations of the packet loss counter 27 when the communicator 12 receives a communication state monitoring packet will be described. First, as shown in FIG. 10, the packet loss counter 27 acquires communication state information (i.e. the number of received packets R and the number of detected packet loss detections L) included in the communication state monitoring packet (ST221). Next, the packet loss counter 27 acquires an estimated value of available bandwidth (ST222). Then, the packet loss counter 27 acquires an assumed packet loss rate and an assumed packet loss period T assumed from the estimated available bandwidth (ST223).

Next, the packet loss counter 27 determines whether the number of packet loss detections L is a positive number or not; that is, whether or not there is a packet loss (ST224).

If there is no packet loss (No in ST224), the counter for counting the number of successively received packets C0 is set to a value obtained by adding the number of received packets R to the number of successively received packets C0. The counter for counting the actual number of successively received packets C1 is set to a value obtained by adding the number of received packets R to the actual number of successively received packets C1 (ST225).

Next, the packet loss counter 27 notifies the available bandwidth estimator 24 of the number of packet loss detections L (ST226). As a result, the available bandwidth estimator 24 is allowed to calculate an estimated available bandwidth using the number of packet loss detections L.

If there is a packet loss (Yes in ST224), the counter for counting the number of random loss detections C2 is set to a value obtained by adding the number of packet loss detections L to the number of random loss detections C2 (ST227).

Next, a timer starts timing measurement (ST228).

The packet loss counter 27 determines whether or not a previous timer value (an elapsed time since the previous packet loss detection), i.e. a packet loss occurrence interval, exceeds a predetermined threshold (for example, 60 seconds) (ST229).

If the previous timer value is less than or equal to the threshold (No in ST229), next, the packet loss counter 27 determines whether or not the actual number of successively received packets C1 exceeds a predetermined threshold (for example, 100,000) (ST230). This threshold is determined based on a packet loss rate assumed in regard to the communication path.

If C1 is less than or equal to the threshold (No in ST230), next, the packet loss counter 27 determines whether or not the number of successively received packets C0 exceeds a value (C2×T) obtained by multiplying the number of random loss detections C2 by the assumed packet loss period T determined from the current estimated bandwidth (ST231).

If the number of successively received packets C0 exceeds the value (C2×T) (No in ST231), the packet loss counter 27 determines that the packet loss is a congestion loss. Then, the counter for counting the actual number of successively received packets C1 and the counter for counting the number of successively received packets C0 are both cleared (initialized) so that the number of successively received packets C0 and the actual number of successively received packets C1 are set to the number of received packets R notified by an RTCP-RR packet. The counter for counting the number of random loss detections C2 is cleared; that is, the number of random loss detections C2 is set to 0 (ST232). Then, the packet loss counter 27 notifies the available bandwidth estimator 24 of the number of packet loss detections L (ST226).

If the previous timer value exceeds the threshold (Yes in ST229), the actual number of successively received packets C1 is less than or equal to the threshold (Yes in ST230), and the number of successively received packets C0 is less than or equal to C2×T (Yes in ST231), the packet loss counter determines that the packet loss is a random loss. Then, only the counter for counting the actual number of successively received packets C1 is cleared (initialized) and C1 is set to the number of received packets R acquired from an RTCP-RR packet. That is, the packet loss counter 27 determines that no packet loss is detected. The counter for counting the number of successively received packets C0 is set to a value obtained by adding the number of received packets R to the number of successively received packets C0. The number of packet loss detections L is set to 0 (ST233). Then, the packet loss counter 27 notifies the available bandwidth estimator 24 of the number of packet loss detections L (ST226).

According to the present embodiment, even when a significant increase in available bandwidth occurs due to communication path switching, the above-described control enables efficient utilization of available bandwidths to increase a code amount used in encoding an image, thereby improving image quality. Also, even when a significant decrease in available bandwidth occurs due to communication path switching, the above-described control quickly allows for congestion avoidance so as to prevent an increase in delay time and prevent occurrence of packet losses, thereby improving image quality.

Second Embodiment

Next, a second embodiment of the present invention will be described. Except for what will be discussed here, the configuration of the second embodiment is the same as that of the first embodiment.

While, in the first embodiment, an available bandwidth is estimated according to TFRC (TCP-Friendly Rate Control), in the second embodiment, available bandwidth estimation is conducted according to a method adopting BCC (Binomial Congestion Control Algorithms).

According to a standard control method adopting BCC, a previous (past) available bandwidth w is stored as historical communication state information i.e. information on a past communication state(s). When there is no packet loss, after a predetermined time has elapsed, the available bandwidth w is incrementally increased as the following equation (bandwidth calculation equation), $$w<=w+\alpha/w^k \ (\alpha>0),$$

and when there is a packet loss, immediately after a packet loss detection, the available bandwidth w is reduced by multiplication as the following equation, $$w<=w-(1-\beta)\times w^l (0<\beta<1),$$

where k and l can be various combinations of values.

In the second embodiment, when a handover notification (path switching notification) is received, the previous (past) available bandwidth w (historical information) stored in the storage 14 is discarded and replaced with an available bandwidth w0 notified from the communication controller 3. Specifically, instead of $w<=w+\alpha/w^k$, $$w<=w0$$

is used.

In the second embodiment, the controller 13 transits from the normal state to the transient state triggered by occurrence of a handover in the same manner as the first embodiment. However, the state transition from the transient state to the normal state is controlled only by using a timer without using packet loss detection result.

Furthermore, in the second embodiment, factors k and l (parameters) are changed between the normal state and the transient state. Specifically, in the normal state, the factors (k, l)=(1, 0) are used, providing stable IIAD (Inverse-Increase/Additive Decrease), and in the transient state immediately after handover. factors (k, l)=(0, 1) are used, providing AIMD (Additive-Increase/Multiplicative-Decrease), which accelerates final determination of the available bandwidth. In the transient state after a predetermined time has elapsed from handover, factors (k, l)=(1/2, 1/2) are used, providing SQRT, which is relatively stable and accelerates final determination of the available bandwidth. Then, after a further predetermined time has elapsed, the controller 13 returns to the normal state.

While specific embodiments of the present disclosure are described herein for illustrative purposes, the present disclosure is not limited thereto. It will be understood that various changes, substitutions, additions, and omissions may be made for elements of the embodiments without departing from the scope of the present invention. In addition, elements and features of the different embodiments may be combined with each other as appropriate to yield an embodiment which is within the scope of the present invention.

INDUSTRIAL APPLICABILITY

An image transmission apparatus, an image transmission system, and a code amount control according to the present invention achieve the effects to enables efficient utilization of an available bandwidth by properly estimating the available bandwidth even when the available bandwidth significantly changes upon occurrence of communication path switching, and are useful as an image transmission apparatus for transmitting an image data to an image reception apparatus via a communication path including a wireless section, an image transmission system for transmitting an image data from an image transmission apparatus to an image reception apparatus via a communication path including a wireless section, and a code amount control method for controlling a code amount used in encoding an image to generate an image data and transmitting the image data to an image reception apparatus via a communication path including a wireless section.

GLOSSARY

1 image transmission apparatus
2 image reception apparatus
3 user terminal (terminal apparatus)
12 communicator
13 controller
14 storage
21 image encoder
22 packetizer
23 communication state monitor
24 available bandwidth estimator
25 encoding controller
26 historical information rewriter
27 packet loss counter

The invention claimed is:

1. An image transmission apparatus for transmitting an image data to an image reception apparatus via a communication path including a wireless section, the image transmission apparatus comprising:
a communication device configured to transmit the image data to the image reception apparatus;
a storage configured to store historical communication state information which is information on a past communication state; and
a processor configured to estimate a current available bandwidth based on the historical communication state information to control a code amount used in encoding an image,
wherein, upon occurrence of communication path switching, the processor
acquires a temporary available bandwidth value corresponding to a new communication path,
generates new communication state information corresponding to a new communication state including at least one of packet loss rates and packet loss periods based on the temporary available bandwidth value,
replaces the historical communication state information stored in the storage with the new communication state information, and estimates a new available bandwidth based on the new communication state information stored in the storage.

2. The image transmission apparatus according to claim 1, wherein the communication device receives a path switching notification transmitted from a communication control apparatus located on the communication path, and
wherein the processor acquires the temporary available bandwidth value corresponding to the available bandwidth from the path switching notification.

3. The image transmission apparatus according to claim 1, wherein the processor uses a predetermined table to generate the new communication state information from the temporary available bandwidth value.

4. The image transmission apparatus according to claim 1, wherein the processor acquires a predetermined number of detection values representing an amount of occurrence of packet losses up to a present time, performs weighted averaging of the predetermined number of detection values by using weighting factors to provide an average number of detection values, and calculates an estimated available bandwidth from the average number of detection values by using a predetermined calculation formula, and immediately after the communication path switching, the processor transits from a normal state to a transient state, in which the weighting factors to be used are changed to weighting factors for the transient state.

5. The image transmission apparatus according to claim 4, wherein, when the processor is in the transient state, the processor performs the weighted averaging of the predetermined number of detection values by multiplying each new detection value by a larger weighting factor than a corresponding one used in the normal state, and multiplying each old detection value by a smaller weighting factor than a corresponding one used in the normal state.

6. The image transmission apparatus according to claim 4, wherein the processor returns to the normal state when a predetermined time has elapsed after the transition to the transient state.

7. The image transmission apparatus according to claim 4, wherein the processor returns to the normal state when a number of detected packet losses exceeds a predetermined threshold.

8. The image transmission apparatus according to claim 4, wherein the processor returns to the normal state when a number of packets successively received after one occurrence of a packet loss exceeds a value assumed from the estimated available bandwidth.

9. The image transmission apparatus according to claim 4, wherein the processor returns to the normal state when a predetermined time has elapsed after one occurrence of a packet loss.

10. The image transmission apparatus according to claim 1, wherein, when estimating an estimated available bandwidth based on an amount of occurrence of packet losses, the processor determines whether or not each packet loss is a random packet loss caused by external noise in the wireless section, and when the packet loss is determined to be a random packet loss, the processor eliminates the packet loss in estimation of the estimated available bandwidth.

11. An image transmission system for transmitting an image data from an image transmission apparatus to an image reception apparatus via a communication path including a wireless section,
wherein the image transmission apparatus comprises:
a communication device configured to transmit the image data to the image reception apparatus;
a storage configured to store historical communication state information which is information on a past communication state; and
a processor configured to estimate a current available bandwidth based on the historical communication state information to control a code amount used in encoding an image;
wherein, upon occurrence of communication path switching, the processor
acquires a temporary available bandwidth value corresponding to a new communication path,
generates new communication state information corresponding to a new communication state including at least one of packet loss rates and packet loss periods based on the temporary available bandwidth value,
replaces the historical communication state information stored in the storage with the new communication state information, and
estimates a new available bandwidth based on the new communication state information stored in the storage.

12. A code amount control method for controlling a code amount used in encoding an image to generate an image data and transmitting the image data to an image reception apparatus via a communication path including a wireless section, the method comprising:
estimating, by a processor, a current available bandwidth based on historical communication state information which is information on a past communication state stored in a storage and controlling the code amount used in encoding the image; and
upon occurrence of communication path switching, performing via the processor
acquiring a temporary available bandwidth value corresponding to a new communication path,
generating new communication state information corresponding to a new communication state including at least one of packet loss rates and packet loss periods based on the temporary available bandwidth value,
replacing the historical communication state information stored in the storage with the new communication state information, and
estimating a new available bandwidth based on the new communication state information stored in the storage.

* * * * *